United States Patent
Laschinsky et al.

(10) Patent No.: US 7,640,472 B2
(45) Date of Patent: Dec. 29, 2009

(54) SERIALIZATION OF HARDWARE AND SOFTWARE DEBUG DATA

(75) Inventors: Bernhard Laschinsky, Allentown, PA (US); Neil C. Puthuff, Ladera Ranch, CA (US); Francis H. Reiff, Manitou Springs, CO (US); Million Woldesenbet, Annandale, NJ (US)

(73) Assignee: Agere Systems Inc., Allentown, PA (US)

( * ) Notice: Subject to any disclaimer, the term of this patent is extended or adjusted under 35 U.S.C. 154(b) by 221 days.

(21) Appl. No.: 11/712,027

(22) Filed: Feb. 28, 2007

(65) Prior Publication Data

US 2007/0240020 A1  Oct. 11, 2007

Related U.S. Application Data

(60) Provisional application No. 60/790,279, filed on Apr. 7, 2006.

(51) Int. Cl.
 G11R 31/28   (2006.01)
 G06F 11/00   (2006.01)
(52) U.S. Cl. .......................................... 714/724; 37/39
(58) Field of Classification Search ................... 714/37, 714/38, 39, 45, 47, 724, 733, 734, 725, 732
 See application file for complete search history.

(56) References Cited

U.S. PATENT DOCUMENTS 6,912,675 B2 * 6/2005 Swoboda ..................... 714/45
6,985,848 B2 * 1/2006 Swoboda et al. ............... 703/26
7,426,579 B2 * 9/2008 McDaniel ................... 709/250
7,475,303 B1 * 1/2009 Edgar et al. ................. 714/724

OTHER PUBLICATIONS

"*CoreSight On-chip Debug and Trace Technology*," ARM, The Architecture for the Digital World, http://web.archive.org/web/20050307232333/http://www.arm.com/p..., Mar. 7, 2005, 2 pages.
"*High Speed Serial Trace Port*," ARM, The Architecture for the Digital World, Sep. 24, 2005, pp. 1-4.

* cited by examiner

*Primary Examiner*—Phung M Chung
(74) *Attorney, Agent, or Firm*—Mendelsohn, Drucker & Associates, P.C.

(57) ABSTRACT

An integrated circuit (IC) having a link layer that (1) simultaneously receives both hardware debug data from on-chip ASIC logic and software debug data from an on-chip programmable processor and (2) serializes the hardware and software debug data streams to generate one or more serialized debug data streams, e.g., containing both hardware and software debug data, for output to off-chip debug testing equipment to support debug testing of both the ASIC logic and the programmable processor. Cross triggering can be implemented on-chip to support simultaneous display of correlated hardware and software debug information on appropriate monitors. The present invention supports debug testing using external debug testing equipment that does not require a hardware logic analyzer.

20 Claims, 3 Drawing Sheets

200

210

SERIALIZATION OF HARDWARE AND SOFTWARE DEBUG DATA

CROSS-REFERENCE TO RELATED APPLICATIONS

This application claims the benefit of the filing date of U.S. provisional application No. 60/790,279, filed on Apr. 7, 2006, the teachings of which are incorporated herein by reference.

BACKGROUND OF THE INVENTION

1. Field of the Invention

The present invention relates to integrated circuits (IC) and, more specifically, to the transfer of hardware and software debug data off chip.

2. Description of the Related Art

FIG. 1 shows a block diagram of a prior-art debug testing configuration 100 for a conventional integrated circuit 102 having both ASIC (application-specific integrated circuitry) logic 104 and a programmable processor 106. In addition to IC 102, debug testing configuration 100 has a hardware logic analyzer 112, a trace port analyzer 114, and two monitors: hardware monitor 116 and software monitor 118. Hardware logic analyzer 112 is connected by X-lane bus 120 to input/output (I/O) pins 122 of IC 102, while trace port analyzer 114 is connected by Y-lane bus 124 to I/O pins 126 of IC 102.

Note that the number of I/O pins required by X-lane bus 120 and Y-lane bus 124 will depend on the type of signaling involved. For example, in differential signaling, each lane will have two pins, one for each half of the differential signal, while only one pin is required for single-ended signaling. In addition to the one or two pins per lane, additional pins may be required for power, ground, clock, and/or control signals associated with different sets of lanes.

As shown in FIG. 1, in addition to ASIC logic 104 and programmable processor 106, IC 102 includes trace logic 108, which captures information about the status of the processing implemented by programmable processor 106 so that the information can be analyzed and debugged off-chip. Trace logic blocks are commonly used in the art for creating software debug traces. Trace logic 108 may be based on the EMBEDDED TRACE MACROCELL™ (ETM) technology by ARM Ltd. of Cambridge, England.

During debug testing, trace logic 108 provides Y bitstreams of software debug data for transmission in parallel from IC 102 to trace port analyzer 114 via I/O pins 126 and bus 124. At the same time, ASIC logic 104 provides X bitstreams of hardware debug data for transmission in parallel from IC 102 to hardware logic analyzer 112 via I/O pins 122 and bus 120 to enable the processing of ASIC logic 104 to be analyzed and debugged off-chip.

During conventional debug testing of IC 102, it is often desirable to correlate the operations of ASIC logic 104 and programmable processor 106. This correlation can be achieved using active cross triggering, in which the detection of a particular event in one of the processing blocks is used to trigger the operations of the other processing block such that the operations of the two processing blocks will be correlated. For example, trace logic 108 and/or trace port analyzer 114 can be designed or programmed to (1) detect when a particular set of data is generated by programmable processor 106 or when a particular set of program code is executed by programmable processor 106 and (2) control the operations of ASIC logic 104 to implement appropriate functions such that the hardware debug data output by ASIC logic 104 will be correlated with the software debug data output by trace logic 108. As indicated by the broken lines shown in FIG. 1, this type of active cross triggering can be implemented either on-chip using trace logic 108 or off-chip using trace port analyzer 114 or both.

Alternatively, ASIC logic 104 and/or hardware logic analyzer 112 can be designed or programmed to (1) detect when a particular set of data is generated by ASIC logic 104 or when particular functions are executed by ASIC logic 104 and (2) control the operations of trace logic 108 and/or programmable processor 106 to implement appropriate functions such that the software debug data output by trace logic 108 will be correlated with the hardware debug data output by ASIC logic 104. As before, this type of active cross triggering can be implemented either on-chip using ASIC logic 104 or off-chip using hardware logic analyzer 112 or both.

Cross triggering can also be implemented in a passive mode in which hardware logic analyzer 112 and trace port analyzer 114 (1) monitor the hardware and software data, respectively, received from IC 102 and (2) communicate via off-chip link 128 to correlate the debug data generated by ASIC logic 104 and programmable processor 106 without actively controlling the operations of either processing block.

Note that, in alternative embodiments, an integrated circuit can have two or more different blocks of ASIC logic and/or two or more different programmable processors. In such cases, the detection of an event in any one processing block (e.g., in either an ASIC logic block or a programmable processor) can be used to trigger operations related to two or more different processing blocks, including combinations of one or more ASIC logic blocks and one or more programmable processors.

In any case, hardware logic analyzer 112 and trace port analyzer 114 process the hardware and software debug data, respectively, received from IC 102 to generate appropriate hardware and software debug displays for rendering on hardware and software monitors 116 and 118.

A certain number of I/O pins on IC 102 are required to support the debug testing of ASIC logic 104 and programmable processor 106. As integrated circuits become more sophisticated, the amount of data required to perform such debug testing increases, resulting in larger values for X and Y and therefore the utilization of more I/O pins for debug testing. The resulting higher pin counts increase IC manufacturing difficulty and cost.

SUMMARY OF THE INVENTION

In one embodiment, the present invention is an integrated circuit (IC) comprising first and second processing blocks and a link-layer block. The first processing block provides hardware debug data for X parallel bitstreams of hardware debug data, and the second processing block provides software debug data for Y parallel bitstreams of software debug data. The link-layer block converts the X bitstreams of hardware debug data and the Y bitstreams of software debug data into N lanes of debug data for output from the IC to support debug testing, where $N<(X+Y)$.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
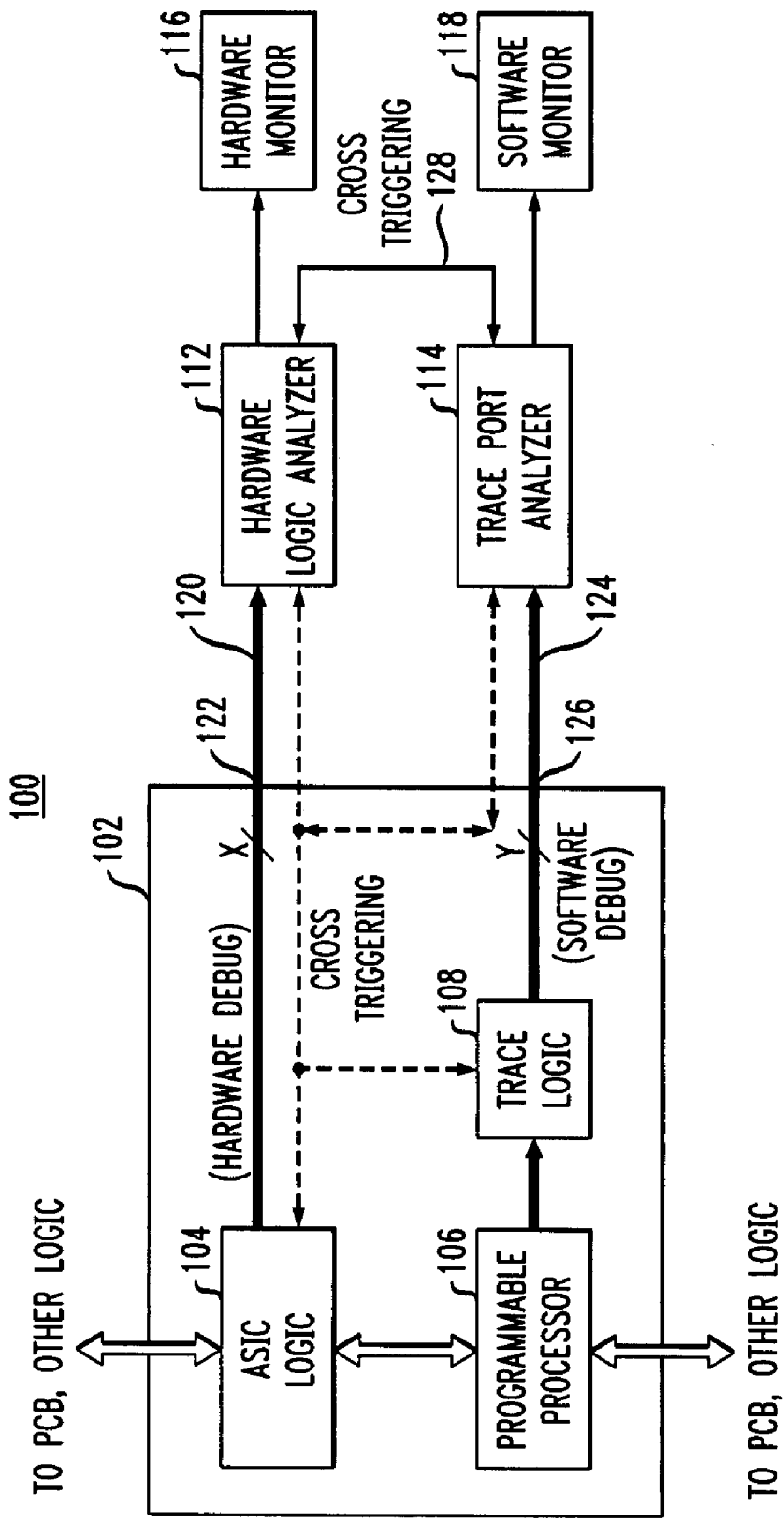
FIG. 1 shows a block diagram of a prior-art debug testing configuration for a conventional integrated circuit.
Figure 2:
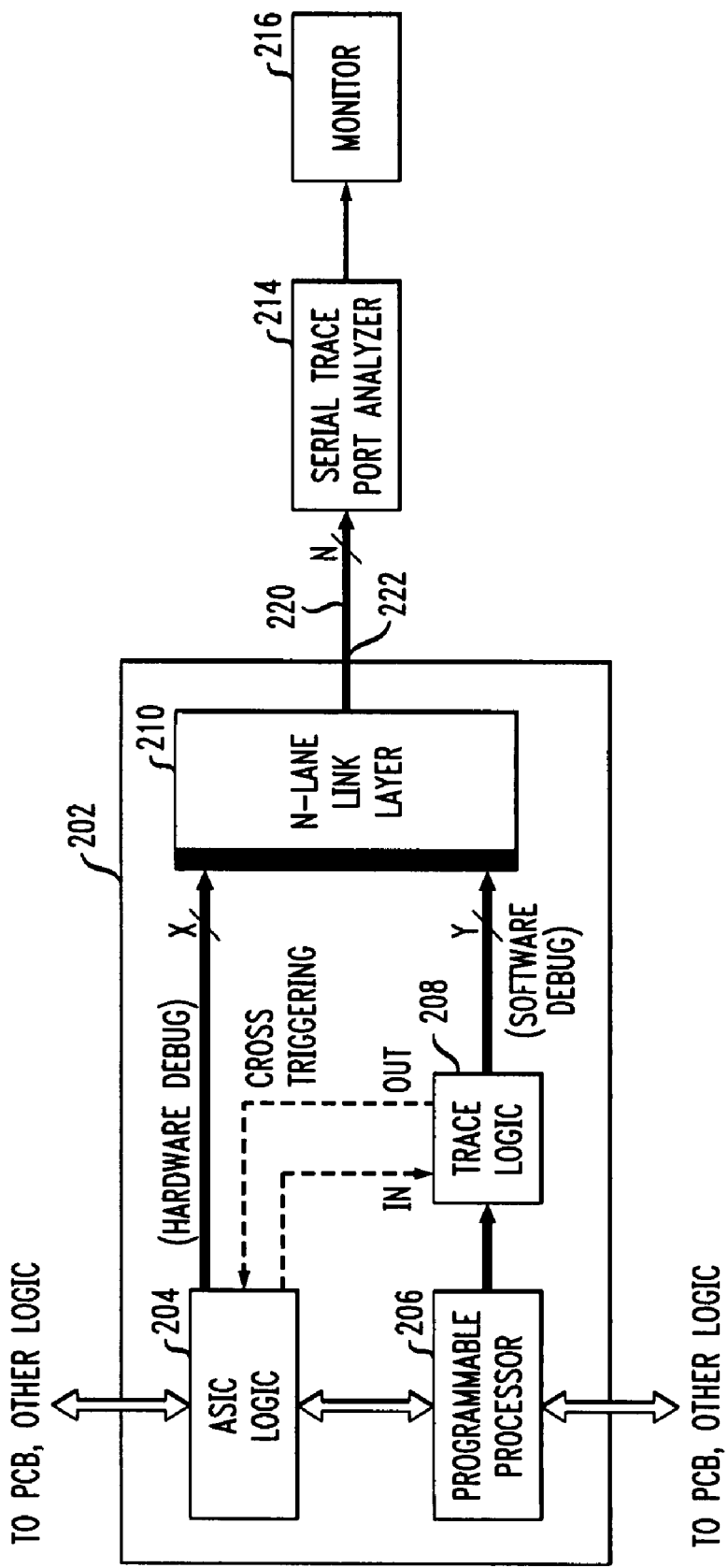
FIG. 2 shows a block diagram of a debug testing configuration for an integrated circuit according to one embodiment of the present invention.

FIG. 2 shows a block diagram of a debug testing configuration 200 for an integrated circuit 202 according to one embodiment of the present invention, in which IC 202 is analogous to (e.g., supports the same data processing applications) as IC 102 of FIG. 1. Like debug testing configuration 100 of FIG. 1, debug testing configuration 200 includes a monitor and a trace port analyzer connected by a bus to I/O pins of IC 202. In this case, however, only one monitor 216 is employed for concurrent rendering of both hardware and software debug displays, and the trace port analyzer is a serial trace port analyzer 214 connected by N-lane serial bus 220 to I/O pins 222 of IC 202, where N<(X+Y). Moreover, debug testing configuration 200 does not have a hardware logic analyzer analogous to analyzer 112 of FIG. 1.

Furthermore, like IC 102 of FIG. 1, IC 202 has ASIC logic 204, programmable processor 206, and trace logic 208. In addition, however, IC 202 has N-lane link layer 210, which (1) receives the X bitstreams of hardware debug data from ASIC logic 204 and the Y bitstreams of software debug data from trace logic 208, and (2) outputs N lanes of combined hardware/software debug data for transmission to serial trace port analyzer 214 via I/O pins 222 and N-lane serial bus 220. Since N is smaller than (X+Y), IC 202 requires fewer I/O pins to support debug testing than does IC 102 of FIG. 1, for an equivalent type of signaling, thereby potentially reducing the total pin count and therefore the cost of IC 202 relative to IC 102.

Figure 3:
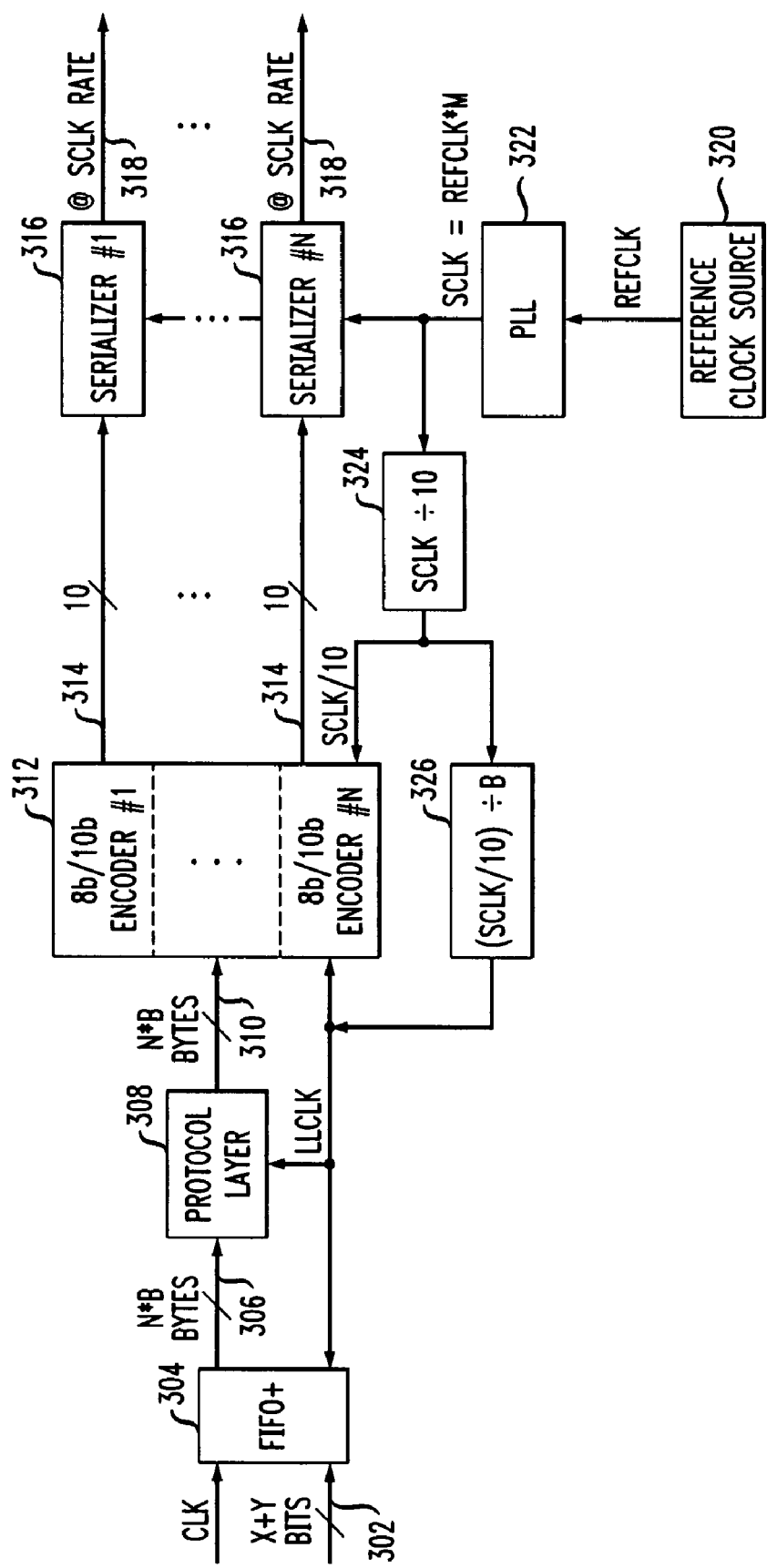
FIG. 3 shows a block diagram of one possible implementation of the N-lane link layer of FIG. 2.

FIG. 3 shows a block diagram of one possible implementation of N-lane link layer 210 of FIG. 2. Link layer 210 receives (X+Y) bitstreams 302 of debug data (i.e., X from ASIC logic 204 and Y from trace logic 208 of FIG. 2) and generates N lanes 318 of serialized debug data for transmission from I/O pins 222 of FIG. 2.

The operations of the components of link layer 210 are controlled by a number of different clock signals. In particular, reference clock source 320 (which may be implemented internal or external to link layer 210 and possibly even external to IC 202) generates reference clock REFCLK. Phase-locked loop (PLL) 322 (which may also be implemented internal or external to link layer 210 and possibly even external to IC 202) receives REFCLK and generates serializer clock SCLK, which is M times faster than REFCLK. SCLK is applied to each of N serializers 316 and to clock divider 324, which divides SCLK by a factor of 10 to generate clock SCLK/10, which is in turn provided to encoder block 312 and clock divider 326, which further divides SCLK/10 by a factor of B to generate link-layer clock LLCLK, which is itself applied to encoder block 312, protocol layer 308, and FIFO (first-in, first-out) buffer 304, which also receives input data clock CLK.

In operation, FIFO 304 receives (X+Y) bits of parallel debug data 302 at every cycle of CLK and outputs N*B bytes of parallel debug data 306 at every cycle of LLCLK. As described later, depending on the particular values of X, Y, N, and B, although the debug data arrives at FIFO 304 as X parallel bitstreams of hardware-only debug bits and Y parallel bitstreams of software-only debug bits, a given set of N*B bytes of debug data output by FIFO 304 may contain all hardware debug bits, all software debug bits, or both hardware and software debug bits.

Protocol layer 308 formats the N*B bytes of debug data 306 according to a suitable transmission protocol. This formatting may involve the addition of overhead data to the debug data. Note that FIFO 304 and protocol layer 308 communicate with each other such that the transmission of valid debug data 306 from FIFO 304 to protocol layer 308 can be temporarily paused to enable protocol layer 308 to add overhead data (e.g., in one or more sets of N*B bytes) to the flow of debug data. The frequency of input data clock CLK and the buffering capacity of FIFO 304 are designed to support these temporary pauses in the flow of data from FIFO 304 to protocol layer 308 such that FIFO 304 does not overflow during such pauses.

At every cycle of LLCLK, N*B bytes of formatted debug data 310 are output in parallel from protocol layer 308 and received by encoder block 312. Encoder block 312 has N 8-bit/10-bit (8 b/10 b) encoders, each of which encodes bytes of the formatted debug data 310 to generate corresponding sets of 10 bits of encoded debug data 314, which are transmitted in parallel to a corresponding serializer 316 at every cycle of SCLK/10. Alternative embodiments may employ other types of encoders, such as 63-bit/64-bit (63 b/64 b) encoders, in which case, different configurations of clock speeds will typically be required to handle the different amounts of generated data.

Each of the N serializers 316 serializes the 10 parallel bitstreams of encoded debug data 314 received from encoder block 312 to generate a single bitstream at a data rate corresponding to the frequency of SCLK. In this way, link layer 210 generates N lanes of serialized debug data, where each lane contains hardware and/or software debug bits. For differential signaling, the N differential lanes of serialized debug data require at least 2N+2 pins: two pins for each differential signal plus one pin for power (e.g., VCC) and another pin for ground (e.g., VSS).

In one exemplary implementation of link layer 210, the number of parallel bitstreams of hardware debug data received at FIFO 304 is X=4, the number of parallel bitstreams of software debug data received at FIFO 304 is Y=20, the number of lanes output by link layer 210 is N=2, and the number of bytes of debug data per lane is B=4. Other implementations can have other combinations of values for X, Y, N, and B, including programmable implementations that can support ranges of values for one or more of these parameters.

In this case, at every cycle of CLK, FIFO 304 receives (X+Y)=24 bits of debug data, and, at every cycle of LLCLK, FIFO 304 outputs (N*B)=8 bytes or 64 bits of debug data. In order to avoid overflowing FIFO 304, the frequency of CLK should be sufficiently less than 64/24 or about 2.67 times the frequency of LLCLK, taking into account the frequency and duration of pauses in the flow of data from FIFO 304 to protocol layer 308 to accommodate the addition of overhead data by protocol layer 308.

Similarly, at every cycle of LLCLK, protocol layer 308 receives (N*B)=8 bytes of debug data and outputs (N*B)=8 bytes of formatted debug data.

In addition, at every cycle of LLCLK, encoder block 312 receives (N*B)=8 bytes or 64 bits of formatted debug data, and, at every cycle of SCLK/10, encoder block 312 outputs (N*10)=20 bits of encoded debug data. Since 8 b/10 b encoder block 312 generates 80 bits of encoded debut data for every 64 bits of formatted debug data, in order to avoid underflowing or overflowing encoder block 312, the frequency of SCLK/10 should be four times the frequency of LLCLK, which corresponds to clock divider 326 dividing SCLK/10 by a factor of B=4, as shown in FIG. 3.

Furthermore, at every cycle of SCLK/10, each serializer 316 receives 10 bits of encoded debug data, and, at every cycle of SCLK, each serializer 316 outputs 1 bit of serialized debug data. In order to avoid underflowing or overflowing serializers 316, the frequency of SCLK should be ten times the frequency of SCLK/10, which corresponds to clock divider 324 dividing SCLK by a factor of 10, as shown in FIG. 3.

The multiplier value of M applied by PLL 322 to REFCLK in order to generate SCLK will depend on the relative frequencies of REFCLK and input data clock CLK. Note that, if REFCLK already has the appropriate frequency for SCLK, then PLL 322 may be omitted.

Thus, in this exemplary implementation, instead of requiring 24 lanes to carry the 4 parallel bitstreams of hardware debug data and the 20 parallel bitstreams of software debug data for debug testing as in prior-art IC 102 of FIG. 1, IC 202 of the present invention requires only 2 lanes, where each lane carries a serialized stream containing hardware and/or software debug data.

Referring again to FIG. 2, the N lanes of serialized debug data generated by link layer 210 are transmitted from IC 202 via I/O pins 222 and N-lane serial bus 220 to serial trace port analyzer 214, which processes the received debug data to generate appropriate hardware and software debug displays for rendering by monitor 216. Note that the processing implemented by serial trace port analyzer 214 will involve de-serialization of the received serialized debug data to recover separate streams of hardware-only debug data and software-only debug data for subsequent (e.g. conventional) debug processing.

As indicated in FIG. 2, IC 202 can be designed and/or programmed to support on-chip cross triggering in which trace logic 208 can monitor the processing of either ASIC logic 204 or programmable processor 206 and possibly control the operations of those processing blocks to enable correlation of the hardware and software debug data by serial trace port analyzer 214, without requiring the use of a hardware logic analyzer, such as analyzer 112 of FIG. 1.

As also indicated in FIG. 2, IC 202 can be configured such that each of ASIC logic 204 and programmable processor 206 receives data from one or more other processing blocks located external to IC 202, for example, from other devices located on the same printed circuit board (PCB) on which is mounted IC 202 or even from devices located external to that PCB. ASIC logic 204 and/or programmable processor 206 can be designed and/or programmed to output debug data (as part of their X and Y bitstreams of debug data, respectively) that depends on such data received from external processing blocks. Note that the data received by ASIC logic 204 and/or programmable processor 206 could be either hardware or software data, depending on the nature of the upstream, off-chip devices that provide the data. In this way, debug testing configuration 200 of FIG. 2 can be used to perform debug testing on hardware and/or software processing blocks located upstream of IC 202.

The present invention has been described in the context of IC 202 of FIG. 2, which is shown as having a single processing block of ASIC logic, a single programmable processor, and a single block of trace logic. The present invention is not so limited. In general, an IC of the present invention can have one or more of each of these components, including different numbers of each different type. In addition, those skilled in the art will understand that FIG. 2 is a simplified block diagram of IC 202 and that, in general, IC 202 may have conventional IC components in addition to those shown in FIG. 2, including, but not limited to, one or more memory blocks, such as ROM and RAM blocks.

Although IC 202 has been described in the context of the particular design for link layer 210 shown in FIG. 3, in general, integrated circuits of the present invention can be implemented using other types of processing blocks that at least perform some degree of serialization of the hardware and software bitstreams to reduce the number of I/O pins required to output debug data for off-chip debug testing, including those that do not perform protocol-layer formatting and/or data encoding.

Although the present invention has been described in the context of debug testing in which both hardware and software debug data are simultaneously output from the IC to off-chip testing equipment, ICs according to certain embodiments of the present invention can also be configured/programmed for hardware-only debugging or software-only debugging, in which only one of the two types of debug data is output to the off-chip testing equipment.

Although the present invention has been described in the context of debug testing configuration 200 of FIG. 2, the present invention is not so limited. In general, the present invention supports debug testing configurations having one or more monitors and one or more serial trace port analyzers.

Although the present invention has been described in the context of differential lanes in which each serialized debug stream is represented differentially for transmission over two wires, the present invention can also be implemented in the context of single-ended lanes in which each serialized debug stream is represented as a single-ended signal for transmission over a single wire.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. An integrated circuit (IC) comprising:
a first processing block that provides hardware debug data for X parallel bitstreams of hardware debug data, X>0;
a second processing block that provides software debug data for Y parallel bitstreams of software debug data, Y>0; and
a link-layer block that converts the X bitstreams of hardware debug data and the Y bitstreams of software debug data into N lanes of debug data for output from the IC to support debug testing, 0>N<(X+Y).

2. The invention of claim 1, wherein at least one of the N lanes comprises both hardware debug data and software debug data.

3. The invention of claim 1, wherein:
the first processing block is a block of application-specific integrated circuitry (ASIC) logic; and
the second processing block is a programmable processing block.

4. The invention of claim 1, further comprising a block of trace logic adapted to monitor the second processing block in order to generate the Y parallel bitstreams of software debug data.

5. The invention of claim 1, wherein the IC is adapted to support on-chip cross triggering between the first and second processing blocks.

6. The invention of claim 5, wherein the supported on-chip cross triggering comprises:
(a) triggering of the second processing block based on monitoring processing of the first processing block; and
(b) triggering of the first processing block based on monitoring processing of the second processing block.

7. The invention of claim 1, wherein:
the lanes are differential lanes; and
the IC comprises 2N+2 input/output (I/O) pins adapted to be connected to off-chip debug testing equipment to provide the N lanes of debug data to the debug testing equipment to implement the debug testing.

8. The invention of claim 7, wherein the debug testing equipment comprises a serial trace port analyzer connected to receive the N lanes of debug data and adapted to generate hardware and software debug displays for rendering on one or more monitors.

9. The invention of claim 8, wherein the serial trace port analyzer de-serializes the N received lanes of debug data.

10. The invention of claim 1, wherein the debug testing is implemented independent of any hardware logic analyzer.

11. The invention of claim 1, wherein at least one of the first and second processing blocks is adapted to receive data from one or more upstream, off-chip devices, wherein at least a portion of the debug data is based on the received data.

12. The invention of claim 11, wherein the first and second processing blocks are both adapted to receive data from one or more upstream, off-chip devices, wherein at least a portion of each of the hardware debug data and the software debug data is based on the received data.

13. The invention of claim 1, wherein:
at least one of the N lanes comprises both hardware debug data and software debug data;
the first processing block is a block of ASIC logic;
the second processing block is a programmable processing block;
further comprising a block of trace logic adapted to monitor the second processing block in order to generate the Y parallel bitstreams of software debug data;
the IC is adapted to support on-chip cross triggering between the first and second processing blocks, wherein the supported on-chip cross triggering comprises:
(a) triggering of the second processing block based on monitoring processing of the first processing block; and
(b) triggering of the first processing block based on monitoring processing of the second processing block;
the lanes are differential lanes;
the IC comprises 2N+2 input/output (I/O) pins adapted to be connected to off-chip debug testing equipment to provide the N lanes of debug data to the debug testing equipment to implement the debug testing;
the debug testing equipment comprises a serial trace port analyzer connected to receive the N lanes of debug data and adapted to generate hardware and software debug displays for rendering on one or more monitors;
the serial trace port analyzer de-serializes the N received lanes of debug data; and
the debug testing is implemented independent of any hardware logic analyzer.

14. The invention of claim 13, wherein the first and second processing blocks are both adapted to receive data from one or more upstream, off-chip devices, wherein at least a portion of each of the hardware debug data and the software debug data is based on the received data.

15. A method implemented by an integrated circuit (IC), the method comprising:
(a) providing hardware debug data, by the IC, for X parallel bitstreams of hardware debug data, X>0;
(b) providing software debug data for Y parallel bitstreams of software debug data, by the IC, Y>0; and
(c) converting the X bitstreams of hardware debug data, by the IC, and the Y bitstreams of software debug data into N lanes of debug data, 0<N<(X+Y); and
(d) outputting the N lanes of debug data from the IC to support debug testing.

16. The invention of claim 15, wherein at least one of the N lanes comprises both hardware debug data and software debug data.

17. The invention of claim 15, wherein the IC is adapted to support on chip cross triggering between first and second processing blocks corresponding to the hardware and software debug data.

18. The invention of claim 15, wherein the debug testing is implemented independent of any hardware logic analyzer.

19. The invention of claim 15, wherein at least one of steps (a) and (b) comprises receiving data from one or more upstream, off-chip devices, wherein at least a portion of the debug data is based on the received data.

20. An integrated circuit (IC) comprising:
(a) means for providing hardware debug data for X parallel bitstreams of hardware debug data, X>0;
(b) means for providing software debug data for Y parallel bitstreams of software debug data, Y>0; and
(c) means for converting the X bitstreams of hardware debug data and the Y bitstreams of software debug data into N lanes of debug data, 0<N<(X+Y); and
(d) means for outputting the N lanes of debug data from the IC to support debug testing.

* * * * *